United States Patent
Zhu et al.

(10) Patent No.: US 10,055,282 B1
(45) Date of Patent: Aug. 21, 2018

(54) METHOD AND APPARATUS OF FEEDING A SEED VALUE TO A PROCESSING UNIT TO INITIALIZE CYCLIC REDUNDANCY CHECKING

(71) Applicant: MARVELL INTERNATIONAL LTD., Hamilton (BM)

(72) Inventors: Jun Zhu, San Jose, CA (US); Akshay Chandra, Santa Clara, CA (US)

(73) Assignee: Marvell International Ltd. (BM)

( * ) Notice: Subject to any disclaimer, the term of this patent is extended or adjusted under 35 U.S.C. 154(b) by 0 days.

(21) Appl. No.: 15/286,720

(22) Filed: Oct. 6, 2016

Related U.S. Application Data (60) Provisional application No. 62/243,280, filed on Oct. 19, 2015.

(51) Int. Cl.
*H03M 13/11* (2006.01)
*G06F 11/10* (2006.01)

(52) U.S. Cl.
CPC ................. *G06F 11/1004* (2013.01)

(58) Field of Classification Search
CPC ..................................... H03M 13/11
USPC .......................................... 714/758, 761, 759
See application file for complete search history.

(56) References Cited

U.S. PATENT DOCUMENTS

| | | | | |
|---|---|---|---|---|
| 7,305,047 B1* | 12/2007 | Turner | ............... | H04L 25/14 370/230 |
| 2007/0033466 A1* | 2/2007 | Buchmann | .......... | G06F 13/4291 714/731 |

* cited by examiner

*Primary Examiner* — Fritz Alphonse (57) ABSTRACT

Systems, methods, and other embodiments associated with cyclic redundancy checking for wide data busses are described. According to one embodiment, a method comprises, in response to detecting a data block on a data bus, identifying a data lane of the data bus on which the data block begins and initializing a starting processing unit of a series of processing units. The starting processing unit corresponds with the identified data lane by issuing a mask input to prior processing units that are ahead of the starting processing unit within the series. Issuing the mask input causes the prior processing units to feed a seed value to the starting processing unit. A cyclic redundancy check value is generated for the data block by initiating the generating from the starting processing unit and iteratively cycling through the series of processing units until the block of data is completed.

20 Claims, 6 Drawing Sheets

METHOD AND APPARATUS OF FEEDING A SEED VALUE TO A PROCESSING UNIT TO INITIALIZE CYCLIC REDUNDANCY CHECKING

CROSS REFERENCE TO RELATED APPLICATIONS

This patent disclosure claims the benefit of U.S. Provisional Application Ser. No. 62/243,280 filed on Oct. 19, 2015, which is hereby wholly incorporated by reference.

BACKGROUND

Cyclic redundancy checking (CRC) refers to a manner of detecting errors in data. The data may be in the form of electronic communications, stored data or other electronic data. In either case, a cyclic redundancy check generally operates by generating a "check value" for a block of data. The check value is calculated against the block of data and generally characterizes the data. In other words, the CRC calculation produces the check value as an abbreviated representation of the block of data.

Thus, the integrity of the block of data can be checked by re-calculating the check value and comparing a newly calculated check value with an original check value. When the two check values do not match, then an error has been introduced into the block of data since the original check value was generated. Accordingly, the check value provides a manner of detecting errors introduced into the data from communicating or storing the data.

However, implementing cyclic redundancy checking is a complex task. For example, pipelining sub-processes of a cyclic redundancy check calculation presents difficulties since each step is dependent on a result from a previous step. In other words, because CRC is cyclic and a next calculation depends on a result of a current calculation, pipelining operations in parallel is generally not feasible. Many existing solutions attempt to circumvent this difficulty by using additional circuitry to manipulate the data on the data bus. However, such solutions typically suffer from increased costs associated with increased chip area.

Moreover, as data throughput increases, bus width within associated circuitry also increases, which translates to an increased number of calculations performed in each clock cycle to maintain timing within the circuitry. Prior solutions fail to maintain the timing at these increased bandwidths because of an inability to efficiently process the data. These inefficiencies arise from circuitry in the processing/data path that slows down the propagation of data through the circuit and complicates timing. Consequently, the process of generating and checking CRC values becomes a bottleneck that slows down operation of an associated device. These difficulties are further exaggerated in relation to performing CRC calculations on high throughput data carried over data busses of increasing widths as is becoming more common in advanced communications and storage devices.

SUMMARY

In general, in one aspect this specification discloses an apparatus. The apparatus includes a plurality of processing units connected together in series with an output of each respective one of the plurality of processing units connected to a first input of a subsequent one of the plurality of processing units in the series, wherein the plurality of processing units are configured to produce a cyclic redundancy check (CRC) value for a data block. A plurality of multiplexors are respectively connected with a second input of respective ones of the plurality of processing units. A plurality of data lanes are connected to the plurality of multiplexors to provide sub-blocks of the data block to respective ones of the plurality of multiplexors, wherein each of the plurality of multiplexors is configured to switch between providing (i) a mask input, and (ii) an input from a respective one of the plurality of data lanes. A control logic is in communication with the plurality of multiplexors, wherein the control logic is configured to initialize a starting processing unit of the plurality of processing units that corresponds with one of the plurality of data lanes on which the data block begins by controlling respective ones of the plurality of multiplexors to issue the mask input to prior processing units that are ahead of the starting processing unit within the series, and wherein the control logic is configured to issue the mask input to control the prior processing units to feed a seed value to the starting processing unit.

In general, in another aspect, this specification discloses a method that includes, in response to detecting a data block on a data bus, identifying a data lane of the data bus on which the data block begins and initializing a starting processing unit of a series of processing units. The starting processing unit corresponds with the identified data lane by issuing a mask input to prior processing units that are ahead of the starting processing unit within the series. Issuing the mask input causes the prior processing units to feed a seed value to the starting processing unit. A cyclic redundancy check value is generated for the data block by initiating the generating from the starting processing unit and iteratively cycling through the series of processing units until the block of data is completed.

In general, in another aspect, this specification discloses a circuit. The circuit includes a cyclic redundancy check (CRC) block including: a plurality of processing units connected together in series; a plurality of multiplexors respectively connected with ones of the plurality of processing units; and a plurality of data lanes connected to the plurality of multiplexors to provide sub-blocks of the data block to respective ones of the plurality of multiplexors, wherein each of the multiplexors are configured to switch between providing a mask input and an input from a respective one of the plurality of data lanes. The circuit further includes a control logic in communication with the multiplexors, wherein the control logic is configured to control select ones of the plurality of multiplexors to issue the mask input in place of data from respective ones of the plurality of data lanes in order to feed a seed value to one of the plurality of processing units that corresponds with a data lane on which the data block begins.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa.

DETAILED DESCRIPTION

Described herein are examples of systems, methods, and other embodiments associated with cyclic redundancy checking for wide data busses. In one embodiment, a circuit is implemented to generate cyclic redundancy check (CRC) values by initiating processing through selectively passing a seed value to a processing unit that correlates with a starting lane of a block of data within a data bus. In this way, the circuit avoids added logic (which introduces timing delays) within a processing path and also avoids added logic for re-arranging the block of data on the data bus to conform to a specific arrangement of the circuit. Accordingly, the disclosed circuit achieves improved processing for wide data busses while also reducing circuit area in comparison to other solutions.

Figure 1:
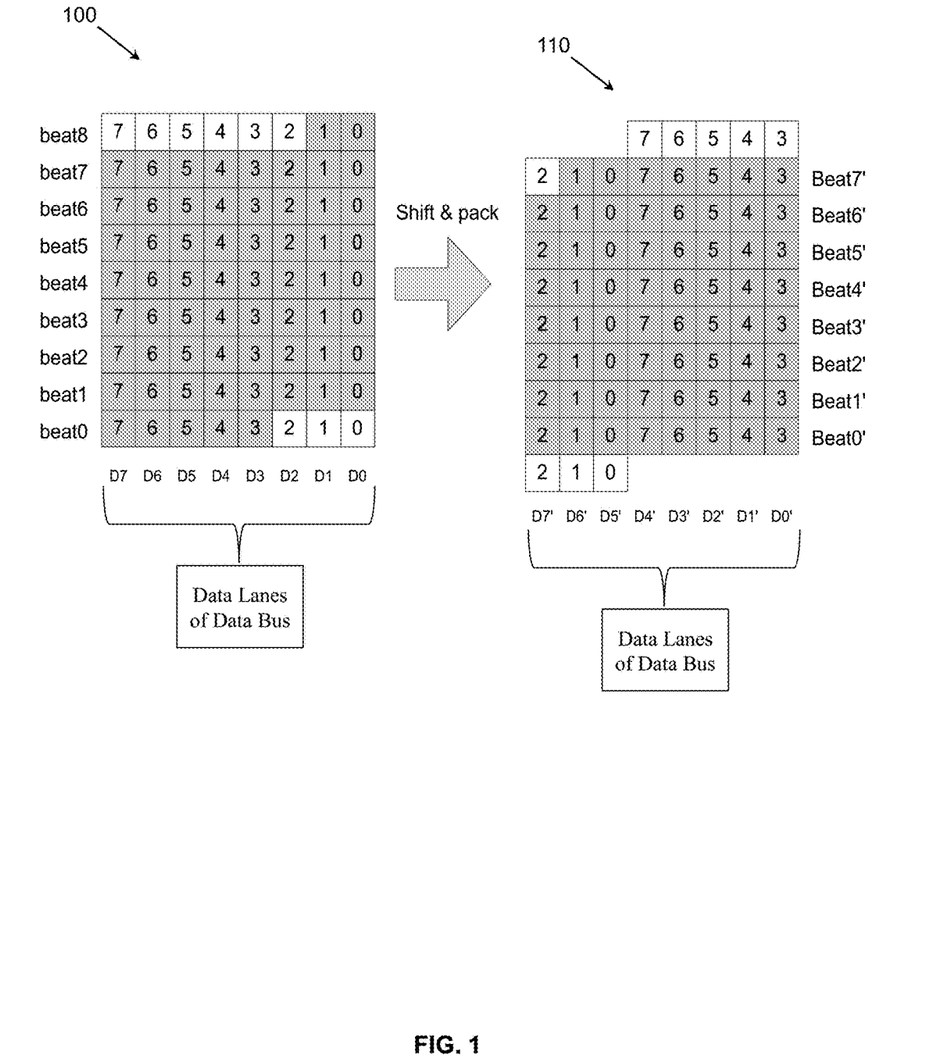
FIG. 1 illustrates one example of re-arranging a data block that is initially not aligned with data lanes of a data bus.

As a further explanation of difficulties overcome by the system and methods disclosed herein, FIG. 1 is discussed with a brief explanation of some general difficulties associated with generating cyclic redundancy check (CRC) values and associated circuits. FIG. 1 illustrates a representation of a data bus including separate data lanes that provide data to a circuit, which produces a CRC value for the data. The data bus illustrated in FIG. 1 includes eight data lanes (D0, D1, D2, D3, D4, D5, D6, and D7). The data lanes are, for example, each 8, 16, 32 or more bits in width depending on a particular implementation. Additionally, each beat (0-8 and 0'-7') depicted in FIG. 1, represents data present on the data lanes at separate clock cycles. That is, the separate beats illustrate sub-portions of a data block that are sequentially present on the data lanes.

Accordingly, as depicted in FIG. 1, highlighted sections represent a block 100 of data as it may be initially provided on the data lanes D0-D7 from a host (e.g., a storage device, communications device, etc.). The block 100 starts at lane D3 of beat 0 and ends at lane D1 of beat 8 as shown by the highlighted sections of the block 100. Accordingly, the block 100 does not initially align with a first data lane D0. Thus, the block 100 is said to be unaligned with the data lanes. Consequently, because calculating the cyclic redundancy check (CRC) value begins with using a seed value to initiate processing and the seed value is available to a processing unit for lane D0, but not for processing units corresponding to subsequent data lanes, the block 100 is re-arranged on the data lanes into the block 110 before beginning the calculation.

Figure 2:
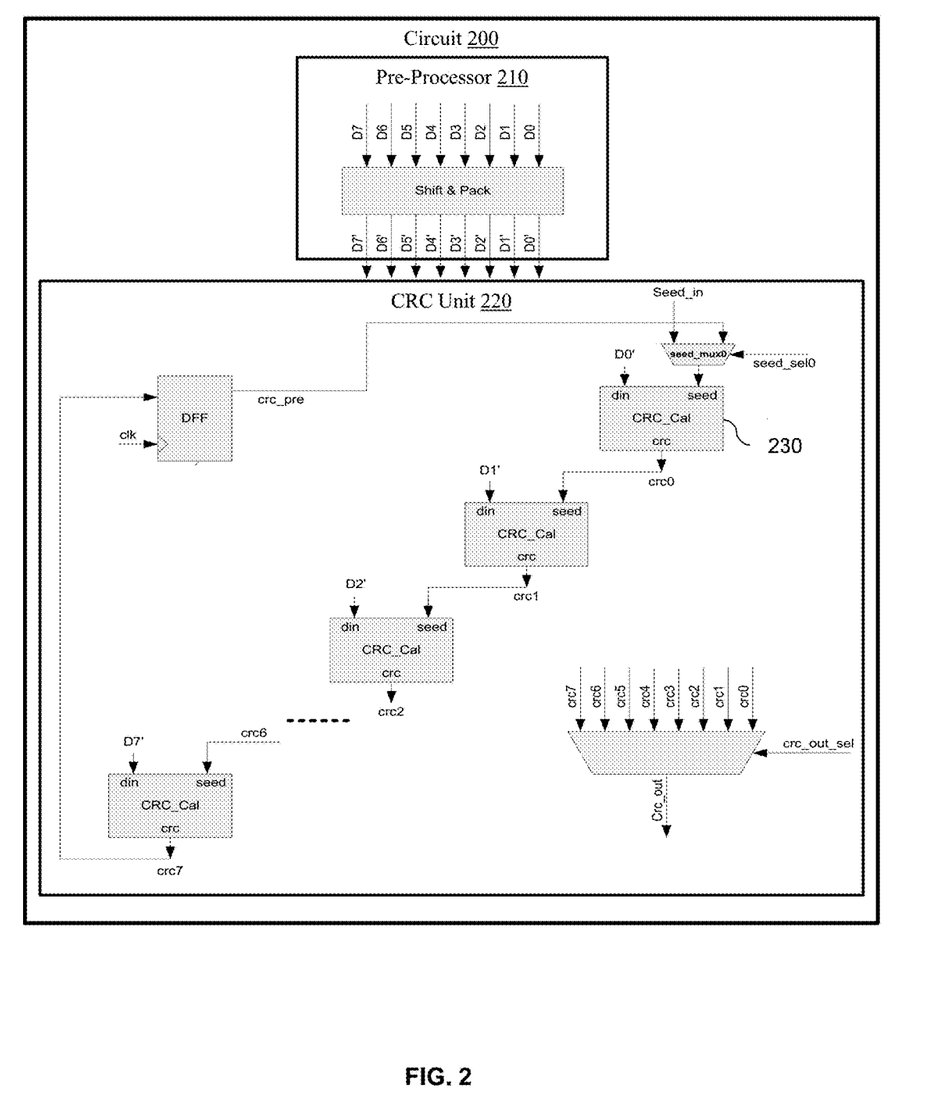
FIG. 2 illustrates one embodiment of a circuit associated with generating CRC values for data blocks after shifting and packing the data blocks.

To further understand the configuration of the data lanes with the processing units, FIG. 2 will now be discussed along with FIG. 1. FIG. 2 illustrates one embodiment of a circuit 200 associated with generating CRC values. The circuit 200 is one example of a circuit that suffers from difficulties associated with meeting timing goals for processing data provided on a wide data bus. For example, the circuit 200 includes a pre-processor 210 and a cyclic redundancy check (CRC) unit 220. The pre-processor 210 re-arranges the block 100 into a format represented by the block 110 of FIG. 1. The pre-processor 210 re-arranges the block 100 so that the CRC unit 220 can initiate generation of the CRC value with a processing unit 230 corresponding with the data lane D0. In other words, because the CRC unit 220 processes input data beginning with the processing unit 230, the block 100 is rearranged to conform with a structure of the CRC unit 220.

If, for example, the block 100 is not aligned such that the data begins at data lane D0, then the CRC unit 210, as configured within FIG. 2, will not produce a correct result. This is because the data initially present on the data lane D0 would be included as part of the CRC calculation; however, the data is not part of the block 100 but is instead leftover data from another block or null space. Using the pre-processor 210 to shift and pack data for each block that is processed increases an amount of time to process the data and also increases an overall physical area of the circuit 200. Thus, the approach implemented by the circuit 200 has increased costs while decreasing throughput.

Figure 3:
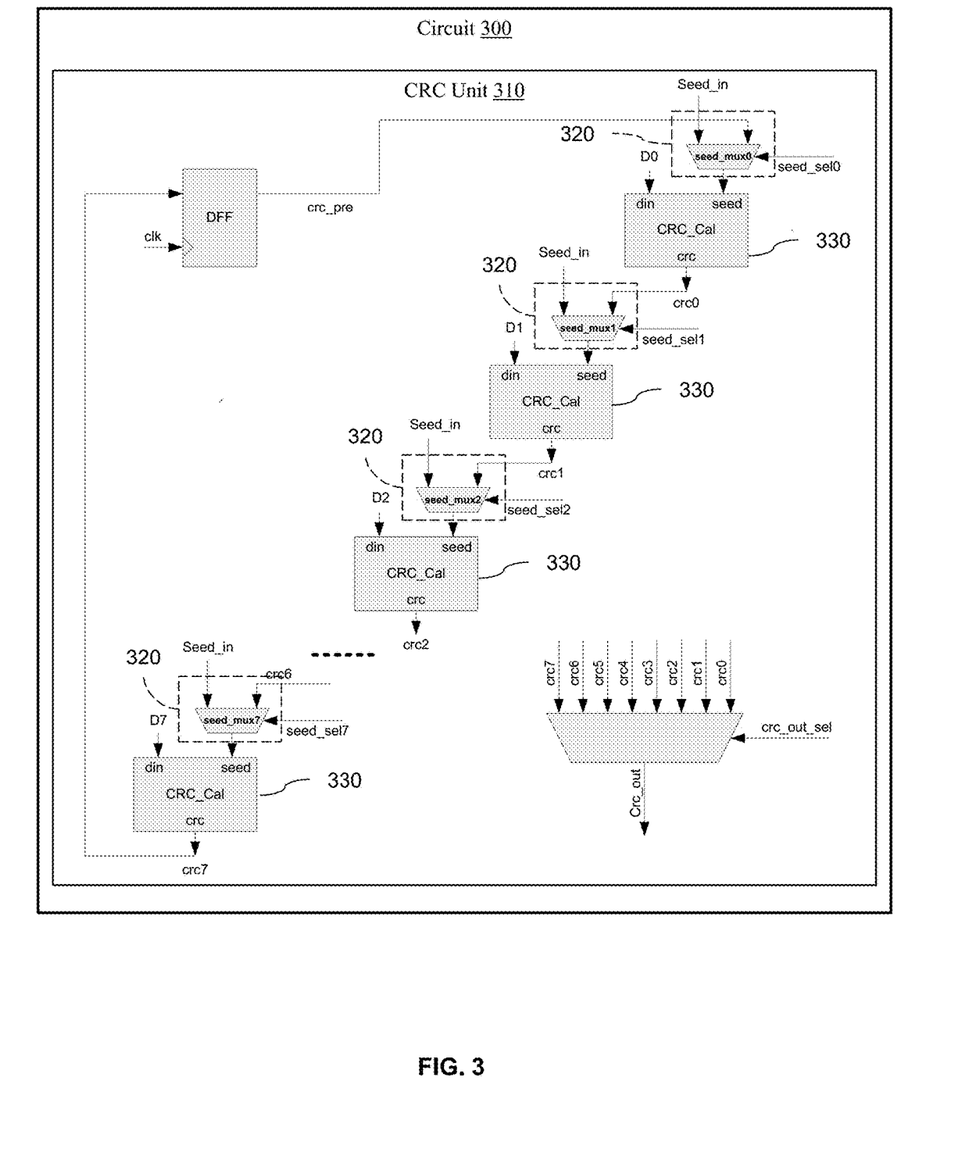
FIG. 3 illustrates one embodiment of a circuit associated with interjecting a seed value into a data path when generating CRC values.

As another example, FIG. 3 illustrates a circuit 300 associated with generating CRC values for blocks of data. The circuit 300 does not include a pre-processor as with the circuit 200 of FIG. 2. However, the circuit 300 includes a CRC unit 310 that is similar to the CRC unit 220 with the exception of the added seed selectors 320. Instead, the circuit 300 replaces the pre-processor 210 by implementing a separate seed selector 320 along with each CRC processing unit 330. By implementing the separate seed selectors 320, the circuit 300 avoids a need to re-arrange the block 100 since either the seed value or data from a previous processing unit can be directly selected as input to each of the processing units 330. Adding the seed selectors 320 permits the circuit 300 to initiate a CRC calculation beginning with whichever one of the data lanes D0-D7 that corresponds with a start of the block 100.

However, as shown in the CRC unit 310, additional logic in the form of the seed selectors 320 is added to the data path between processing units 330. The data path (also referred to as the processing path) of the circuit 300 refers to a path within the circuit 300 through which data of the CRC calculation propagates. As illustrated in FIG. 3, the data/processing path is the circuitry through the processing units 330 and the seed selectors 320 along which input data and results are propagated. In other words, an output of each processing units is connected to a respective seed selector 320 which provides an input to a subsequent one of the processing units 330. Thus, the seed selectors 320 intervene within the data path.

The seed selectors 320 add significant complexity to the data path of the circuit 300, which thereby increases an overall area of the circuit 300. Additionally, because the seed selectors 320 are within the data path of the CRC unit 310, the throughput of the circuit 300 is adversely affected. In general, the throughput is adversely affected due to an increased time for data to propagate through the data path and added complexities of timing along the data path due to the added logic of the seed selectors 320. Accordingly, both the circuit 200 and the circuit 300 suffer from difficulties with meeting necessary throughput and from added costs associated with increased circuit area.

Thus, in one embodiment, a cyclic redundancy check (CRC) circuit removes the seed selector from the data path and instead selects a mask input on a separate input to the processing units to cause the processing units to feed a seed value along a data path to a respective processing unit that aligns with a starting data lane. In this way, the CRC circuit avoids re-arranging input data while also avoiding added circuitry within the data path between the processing units from the seed selectors. Consequently, the circuit realizes improved throughput while using less circuit area than other solutions.

Figure 4:
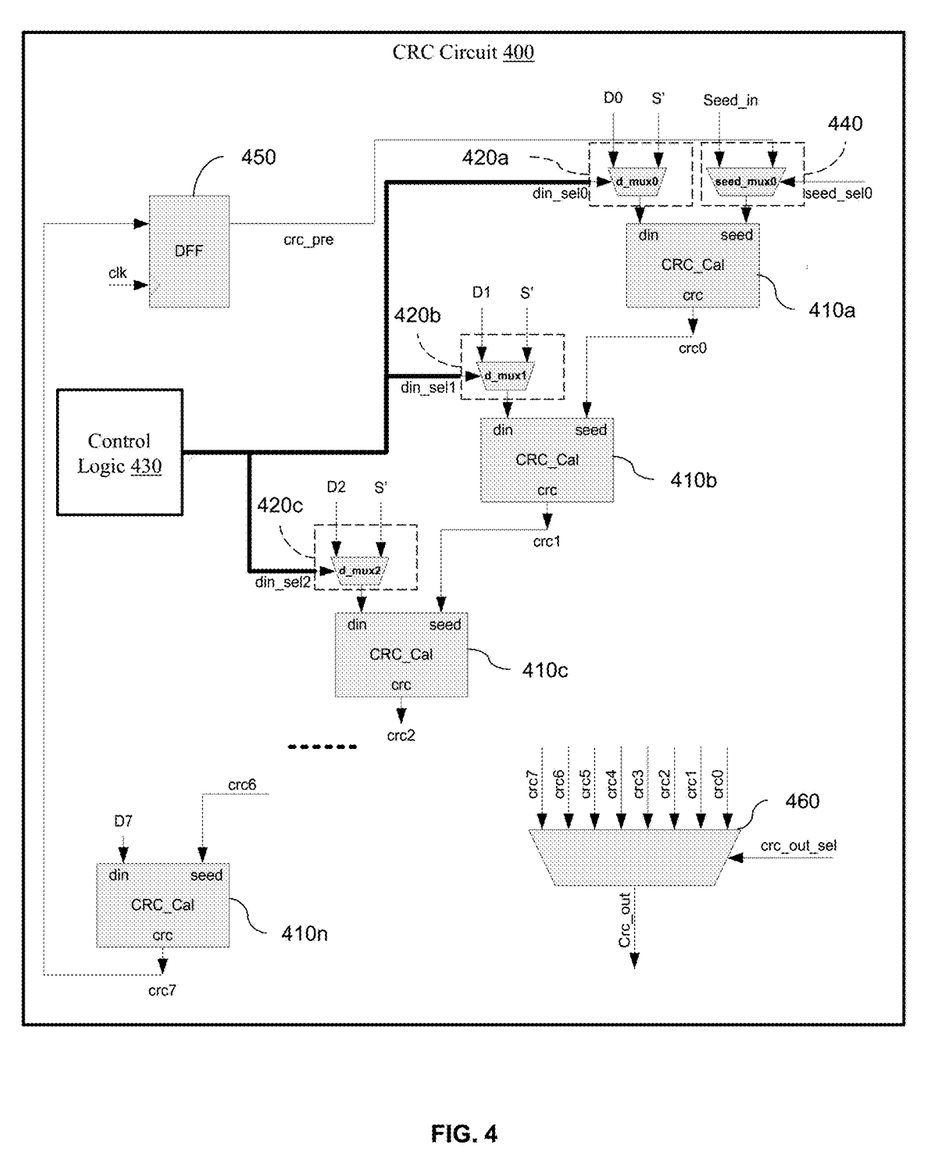
FIG. 4 illustrates one embodiment of a circuit associated with using a mask input to feed a seed value between processing units when initiating a CRC calculation.

With reference to FIG. 4, one embodiment of a cyclic redundancy check (CRC) circuit 400 associated with using a mask input to pass a seed value is illustrated. The CRC circuit 400 includes processing units 410a, 410b, 410c through 410n (collectively referred to herein as processing units 410) where "n" corresponds to a number of data lanes connected to the CRC circuit 400. Thus, depending on a particular implementation, the number of processing units varies such that there is a one-to-one correspondence between processing units and data lanes. As illustrated in FIG. 4, there are eight data lanes D0-D7. Accordingly, a number of processing units 410 is also eight; however, the CRC circuit 400 is abbreviated in FIG. 4 with an ellipsis for purposes of brevity and to illustrate that the number of processing units may vary depending on the implementation.

The separate data lanes D0-D7 illustrated in FIG. 4 form a data bus that has a particular width. The width of the data bus refers to a number of bits that are provided in parallel at a given time on the data bus. For example, the data bus may be 128 bits, 256 bits, 512 bits, 1024 bits wide or wider depending on a particular implementation. In either case, the bits of the data bus are split equally among the data lanes D0-D7. Thus, as illustrated in FIG. 4, each separate one of the data lanes D0-D7 carry 32 bits, 64 bits or another number of bits depending on the implementation. The data bus may be referred to as a "wide" data bus in the sense that a greater number of bits are carried in contrast to other designs. In other words, the data bus carries 1024 bits in comparison to circuits where a data bus is 128 bits. Accordingly, the CRC circuit 400 accommodates the wide data bus and timing requirements for providing CRC values through improvements discussed herein.

In either case, the processing units 410 receive data from respective data lanes. That is, each of the processing units 410 corresponds to one of the data lanes and processes data provided by the respective data lane. Furthermore, as illustrated in FIG. 4, in addition to accepting data from a respective data lane, each of the processing units 410 may also receive a mask input as controlled by the multiplexors 420a, 420b, 420c (Collectively referred to herein as multiplexors 420). In general, each of the processing units 410 is configured with a corresponding one of the multiplexors 420 except for a final processing unit 410n. The processing unit 410n is provided without one of the multiplexors 420 since there is no need to feed the seed value back to the processing unit 410a since the seed value is already available to 410a as an initial input. Furthermore, the multiplexors 420 are not connected to outputs of the processing units and are thus not within a data path between the processing units 410. Accordingly, circuitry associated with the multiplexors 420 does not complicate timing of the data path since the multiplexors are not connected within the data path itself.

A control logic 430 is connected to and communicates with each of the multiplexors 420. The control logic 430 is configured to individually control selected ones of the multiplexors 420 to switch between settings to provide the different inputs. For example, the control logic 430 monitors the data bus to detect the presence of a data block. When the control logic 430 detects the data block, the control logic 430 decodes or otherwise analyzes associated information (e.g., a memory address) of the data block to identify on which of the data lanes D0-D7 of the data bus the data begins (e.g., D3 as shown in FIG. 1). In this way, the control logic 430 identifies to which of the data lanes D0-D7 the data block is aligned.

Thus, in one embodiment, the control logic 430 provides control signals to select ones of the multiplexors 420 that are prior to a starting data lane for the data block to control the select multiplexers 420 to switch to providing the mask input S' instead of input from a respective data lane. As one example, if the control logic 430 detects that the data block begins on data lane D3, as shown in the example of FIG. 1 with the block 100, then the control logic 430 provides control signals to multiplexers 420a, 420b, and 420c to control the multiplexors 420a, 420b, and 420c to issue the mask input S' to the respective processing units 410a, 410b, 410c. Additionally, the control logic 430 also controls a multiplexer 440 to switch to providing the seed value (i.e., Seed_in).

Consequently, the processing units 410a, 410b, 410c perform a CRC calculation on the seed value and the mask input such that an output of each of the respective processing units 410a, 410b, and 410c is the seed value itself. That is, by switching the input to the mask input, the control logic causes the processing units to feed the seed value along the data path without altering the seed value. An output of the processing units 410a, 410b, and 410c that receive the mask input S' is shown by the following.

$$\text{Output}=\text{Seed\_Value}=\text{CRC}(S',\text{Seed\_Value}) \quad (1)$$

In equation 1, CRC indicates a cyclic redundancy check algorithm that operates on the mask input S' and the seed_value as inputs. The Seed value is an initial value provided to the processing unit to initiate a CRC calculation. The mask input is a derived mask value that when combined with the seed value in a CRC calculation causes the output to equal the seed value. For example, if the seed value is 32'hFFFFFFFF, then mask input S' is 32'hB9509BB6. Thus, CRC32 (32'hB9509BB6, 32'hFFFFFFFF)=32'hFFFFFFFF.

"Seed Values" are initialization (initial) values used during CRC calculation. One purpose of seed/initial values is to prevent an All-Zero Data word (e.g. D0=32'h0) from resulting in an All-Zero check sequence value (i.e. to prevent crc0=32'h0 if D0=32'h0). The seed value can also be used to distinguish between transmitters used over a network because only transmitters/receivers with the same "seed_value" can understand each other's messages. In one embodiment, the leading Seed/initial value is lost after the first CRC calculation operation, and all subsequent seed values for the cascaded CRC calculation are the CRC output from the previous calculation block (i.e. seed for CRC_cal (n) will be the crc(n−1) output from the CRC_Cal(n−1) module).

For example, Crc_output=XORing(crc_remainder, seed_value); i.e. Crc_output=seed_value XOR crc_remainder.

In one embodiment, in the process of CRC calculation, the "crc_remainder" is the remainder left behind after performing Polynomial Division over a Galaus Field where the "data_input" (e.g., D0) is the dividend, and the "crc polynomial" (e.g., for CRC-32 the polynomial value is 32'h04C11DB7) is the divisor.

A processing unit 410d (not illustrated) receives the seed value as a result output from the processing unit 410c. The processing unit 410d corresponds with the data lane D3 and a multiplexer 420d (not illustrated) which is controlled by the control logic 430 to provide the beginning section of the data block to the processing units 410d. In this way, the control logic 430 initializes the processing units 410 to perform the CRC calculation for the data block without rearranging the data block and without using extra logic within the data path (i.e., the circuit path directly between the processing units 410).

Once the control logic 430 initiates the CRC calculation, the multiplexors are controlled to provide data from respective data lanes while the multiplexer 440 is controlled to provide a result from the processing unit 410n to complete a loop of the processing units 410. Additionally, further components such as D-flip-flop 450 acts to delay an output of the processing units 410n by one beat (also referred to as a clock cycle) so that the result of the processing unit 410n can be used by the processing unit 410a as an input for a subsequent beat. Once the processing units 410 complete processing of the data block, the control logic 430 controls mux 460 to output the CRC value from a respective one of the processing units 410 that completed processing on a final sub-block of the data block (e.g., processing unit 410b corresponding with data lane D1 as shown in the block 100 of FIG. 1).

Figure 5:
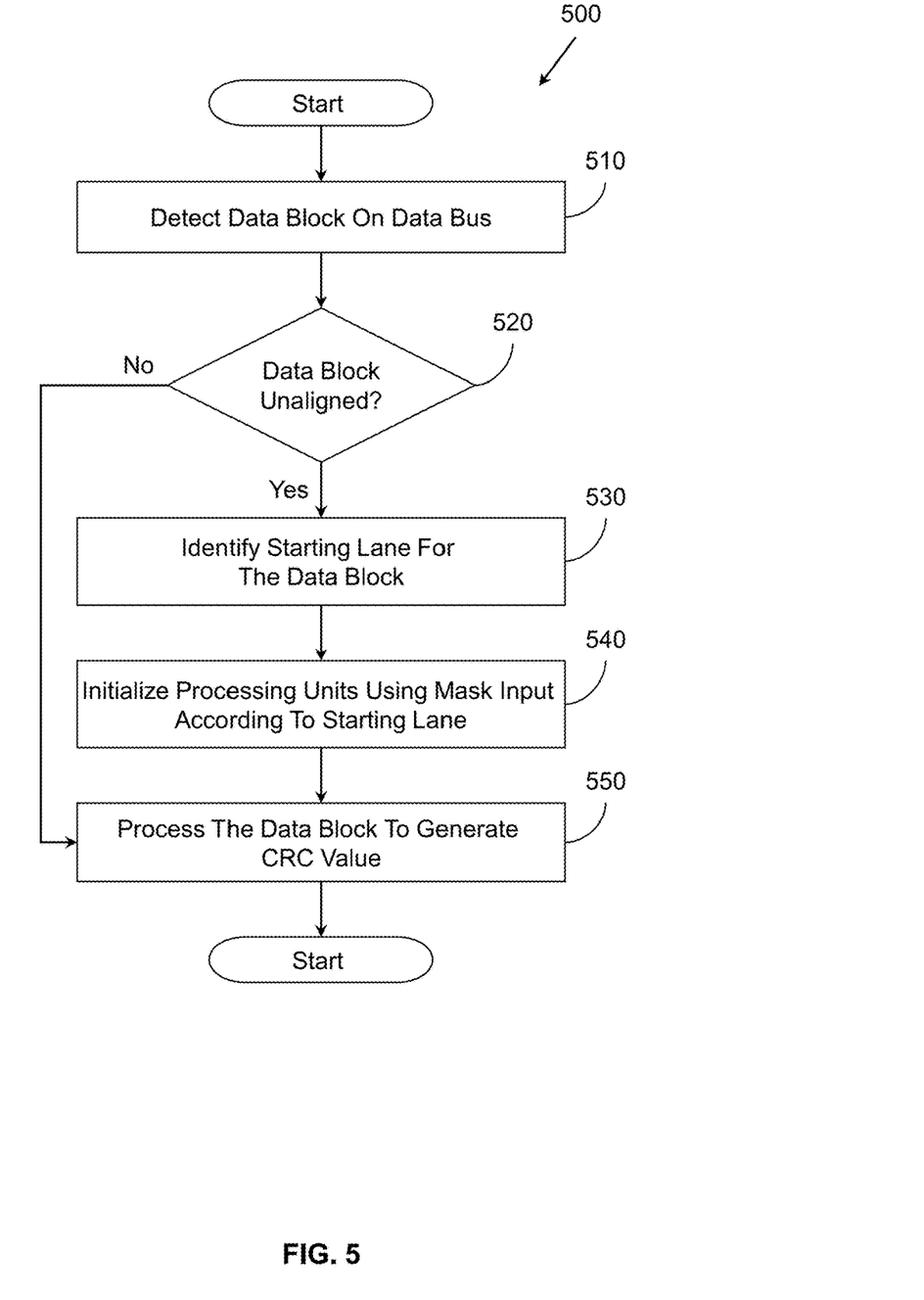
FIG. 5 illustrates one embodiment of a method associated with passing a seed value to a processing unit of a starting lane when generating a CRC value for a wide data bus.

Further aspects of generating CRC values will be discussed in relation to FIG. 5. FIG. 5 illustrates a method 500 associated with initiating a CRC circuit to generate CRC values. The method 500 will be discussed from the perspective of the CRC circuit 400.

At 510, the control logic 430 detects a data block on a data bus. In one embodiment, the control logic 430 monitors the data bus to detect when a data block is present. In other embodiments, the control logic 430 includes an independent connection with a host device that provides a signal to the control logic 430 to identify when a data block is being provided. In either case, the control logic 430 detects the data block and initiates the CRC circuit 400 to generate a CRC value for the data block.

At 520, the control logic 430 identifies whether the data block is aligned with a first date lane (e.g., D0) of the data bus or if the data block begins with another data lane (e.g., D1-D7). In one embodiment, the control logic 430 analyzes a memory address associated with the data block to determine whether the data block is aligned with the first data lane D0. For example, the control logic 430 decodes a memory address of where the data block is stored in a memory device (e.g., a buffer, a flash drive, etc.). From the decoded memory address, the control logic 430 identifies how the data block is provided on the data bus and, thus, whether the data block is aligned with the first data lane D0. As previously discussed in relation to FIG. 1, the data block is aligned when a first sub-block of the data block is provided on the first data lane and subsequent data blocks sequentially follow. If the data block is aligned, then processing continues at 550 with the generation of the CRC value.

However, if the data block is not aligned, then, at 530, the control logic 430 identifies a data lane of the data bus on which the data block begins. As discussed along with 520 of Method 500, the control logic 430 identifies whether the data block is aligned from a memory address associated with the data block or from a separate control signal. Similarly, at 530, the control logic 430, in one embodiment, uses the same information to identify a specific data lane of the data bus on which the block of data begins. By knowing the specific data lane, the control logic 430 also identifies a corresponding processing unit that is a starting processing unit in a series of processing units (e.g., 410a-n) for the CRC calculation.

Accordingly, at 540, the control logic 430 initializes the starting processing unit that corresponds with the identified data lane. In one embodiment, the control logic 430 initializes the starting processing unit by feeding a seed value to the starting processing unit through a data path in the circuit 400. The seed value is, for example, an initial value that is used to prime or otherwise initiate the calculation of the CRC value.

The control logic 430 controls individual ones of the muxes 420 to issue a mask input to the prior processing units of the starting processing unit so that the prior processing units will feed or otherwise pass the seed value from the mux 440 to the starting processing unit without altering the seed value at each of the prior processing units.

Accordingly, the control logic 430, in essence, masks the processing of the prior processing units to cause the prior processing units to pass the seed value. Thus, issuing the mask input to prior processing units that are before/ahead of the starting processing unit within the series of processing units causes the prior processing units to feed the seed value to the starting processing unit. In this way, the circuit 400 avoids re-arranging the data block on the data bus while also avoiding additional circuitry within the data path. For example, if processing unit 410d is the starting processing unit, then processing units 410a, 410b, and 410c are before/ahead of unit 410d in the series; they are upstream from unit 410d in the data path.

At 550, the control logic 430 controls the processing units 420 to generate a cyclic redundancy check (CRC) value for the data block. In one embodiment, the control logic 430 controls the muxes 420 to switch to providing the data block from the data lanes D0-D7 so that the CRC calculation can proceed by iteratively cycling through the series of processing units 410 until the block of data is completed. Once complete the control logic 430 provides a signal to the output mux 460 to cause the mux 460 to select an output lane on which the CRC value is available. As a result, the CRC value is provided as an output from the CRC circuit 400.

As one example of how the CRC circuit 400 and method 500 improve over previous solutions, consider the CRC circuit 400 in relation to the circuit 300 of FIG. 3. When implemented to operate at a frequency of 333 MHz, the circuit 300 has an area of roughly 8600 $\mu m^2$ whereas the circuit 400 has an area of roughly 5200 $\mu m^2$. At 450 MHz the circuit 300 has an area of 9100 $\mu m^2$ while the circuit 400 has an area of 7000 $\mu m^2$. Furthermore, at 450 Mhz the circuit 300 fails to meet timing requirements. Moreover, while the circuit 400 has an improved (i.e., lesser) area in comparison to the circuit 300 and the circuit 200, the circuit 400 also meets timing requirements when operating at 1 GHz and beyond. In contrast, the circuit 300 fails to meet timing requirements at even 450 Mhz. Thus, the circuit 400 operates at three times the speed of the other solutions.

Furthermore, in one embodiment, the improved area of the circuit 400 over the circuit 300 is realized through shared circuitry since the muxes 420 are not within a data path of the circuit 400 this circuitry is actually shared and not redundant as illustrated whereas the muxes 320 of the circuit 300 are separate redundant structures within the data path of the circuit 300.

Figure 6:
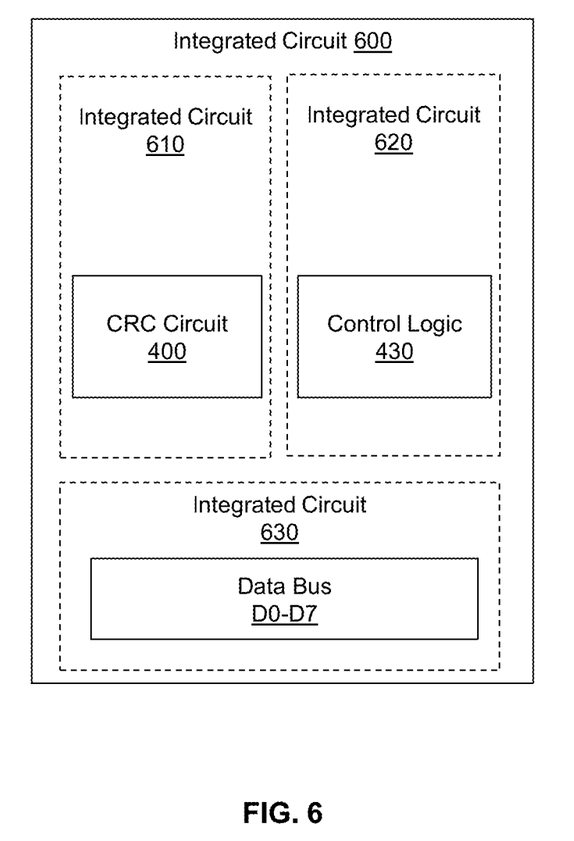
FIG. 6 illustrates one embodiment of an integrated circuit associated with system and methods disclosed herein.

FIG. 6 illustrates an additional embodiment of the CRC circuit 400 from FIG. 4 that is configured with separate integrated circuits and/or chips. In this embodiment, the CRC circuit 400 from FIG. 4 is embodied as a separate integrated circuit 610. Additionally, the control logic 430 is embodied on an individual integrated circuit 620. The data bus D0-D7 is also embodied on an individual integrated circuit 630. The circuits are connected via connection paths to communicate signals. While integrated circuits 610, 620, and 630 are illustrated as separate integrated circuits, they may be integrated into a common integrated circuit board 600. Additionally, integrated circuits 610, 620, and 630 may be combined into fewer integrated circuits or divided into more integrated circuits than illustrated. In other embodiments, portions of the functionality associated with the control logic 430 may be embodied as firmware executable by a processor and stored in a non-transitory memory.

The following includes definitions of selected terms employed herein. The definitions include various examples and/or forms of components that fall within the scope of a term, and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium" as used herein is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C § 101.

"Logic" as used herein includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic, as described herein, is limited to statutory subject matter under 35 U.S.C § 101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

What is claimed is:

1. An apparatus, comprising:
a plurality of processing units wherein each processing unit includes at least a first input, a second input, and an output;
wherein the plurality of processing units are connected together in series where the output of each processing unit is connected to one of the first inputs of a subsequent processing unit in the series, wherein the plurality of processing units are configured to produce a cyclic redundancy check (CRC) value for a data block;
a plurality of multiplexors, wherein each of the second inputs of the plurality of processing units is connected to an output of one multiplexor from the plurality of multiplexors;
a plurality of data lanes each connected to one of the plurality of multiplexors to provide sub-blocks of the data block to each of the plurality of multiplexors, wherein each of the plurality of multiplexors is configured to switch between providing (i) a mask input, and (ii) an input from the data lane connected thereto; and
a control logic in communication with the plurality of multiplexors, wherein the control logic is configured to initialize a starting processing unit of the plurality of processing units that corresponds with one of the plurality of data lanes on which the data block begins by controlling the plurality of multiplexors to issue the mask input to prior processing units that are ahead of the starting processing unit within the series, and wherein the control logic is configured to issue the mask input to control the prior processing units to feed a seed value to the starting processing unit.

2. The apparatus of claim 1, wherein the mask input is a data value that when combined with the seed value in one processing unit of the plurality of processing units causes the one processing unit to pass the seed value as a result without altering the seed value, and wherein the one processing unit passes the seed value to an immediately subsequent one of the plurality of processing units in the series.

3. The apparatus of claim 1, wherein an output of a final processing unit of the plurality of processing units in the series is connected with a first multiplexor that is connected to a first one of the plurality of processing units in the series to form a loop so that a result of the final processing unit of the plurality of processing units is selectively fed back to the first one of the plurality of processing units to support generating the CRC value as an output of the apparatus.

4. The apparatus of claim 1, wherein the starting processing unit uses the seed value as an initial data value to compute an intermediate cyclic redundancy check (CRC) value for an initial sub-block of the data block, wherein the intermediate CRC value is provided as an input to a subsequent one of the plurality of processing units in the series, and wherein each of the plurality of processing units are configured to use a result from a previous one of the plurality of processing units in the series along with one of the sub-blocks to compute intermediate results for the CRC value.

5. The apparatus of claim 1, wherein the plurality of processing units are connected in the series without intervening logic, and wherein the mask input is defined according to the seed value such that one of the plurality of processing units that performs a CRC calculation on the seed value and the mask input provides a result that is the seed value.

6. The apparatus of claim 1, wherein the control logic is configured to identify the one of the plurality of data lanes on which the data block begins according to a memory address associated with the data block, and wherein each of the plurality of data lanes is connected with one of the plurality of multiplexors in a one-to-one correspondence.

7. The apparatus of claim 1, wherein the plurality of data lanes form a data bus that provides the data block to the apparatus, and wherein the control logic is configured to initialize the starting processing unit and begin a CRC calculation for the data block to avoid re-arranging the data block on the plurality of data lanes.

8. A method performed by a circuit that includes at least a plurality of processing units connected in a series and a data bus, the method comprising:
   in response to detecting a data block on the data bus, identifying, by a control logic connected to the circuit, a data lane of the data bus on which the data block begins;
   initializing, by the control logic, a starting processing unit of the series of processing units, wherein the starting processing unit corresponds with the identified data lane by issuing a mask input to prior processing units that are ahead of the starting processing unit within the series of processing units, wherein issuing the mask input causes the prior processing units to feed a seed value to the starting processing unit; and
   generating, by the series of processing units, a cyclic redundancy check value for the data block by initiating the generating from the starting processing unit and iteratively cycling through the series of processing units until the block of data is completed.

9. The method of claim 8, wherein detecting the data block includes identifying whether the data block is aligned with a first data lane of the data bus, and
   wherein identifying the data lane, when the data block begins at a data lane other than the first data lane, includes analyzing a memory address associated with the data block.

10. The method of claim 8, wherein identifying a data lane of a data bus on which the block of data begins includes identifying a corresponding one of the processing units.

11. The method of claim 8, wherein issuing the mask input includes issuing the mask input to selected ones of the series of processing units in place of input from one of the plurality of data lanes of the data bus.

12. The method of claim 8, wherein issuing the mask input feeds the seed value to the starting processing unit and avoids re-arranging the data block on the data bus.

13. The method of claim 8, wherein initializing the starting processing unit includes selecting a mask input as an input to the prior processing units instead of data from a connected data lane of the plurality of data lanes.

14. The method of claim 8, wherein the mask input is defined as a function of the seed value such that one of the processing units that performs a CRC calculation on the seed value and the mask input provides a result that is the seed value.

15. A circuit, comprising:
   a cyclic redundancy check (CRC) block including:
      a plurality of processing units connected together in series;
      a plurality of multiplexors wherein each multiplexor is connected to one of the plurality of processing units; and
      a plurality of data lanes each connected to one of the plurality of multiplexors to provide sub-blocks of the data block to the plurality of multiplexors, wherein each of the multiplexors is configured to switch between providing a mask input and an input from the data lane connected thereto; and
   a control logic in communication with the multiplexors, wherein the control logic is configured to control select ones of the plurality of multiplexors to issue the mask input in place of data from the data lane connected thereto in order to feed a seed value to one of the plurality of processing units that corresponds with a data lane on which the data block begins.

16. The circuit of claim 15, wherein an output of each processing unit of the plurality of processing units is connected to a first input of a subsequent one of the plurality of processing units in the series, wherein the plurality of processing units are configured to produce a cyclic redundancy check (CRC) value for a data block.

17. The circuit of claim 15, wherein the control logic is configured to initialize a starting processing unit of the plurality of processing units that corresponds with one of the plurality of data lanes on which the data block begins by controlling the multiplexor connected to corresponding processing units to issue the mask input to prior processing units that are ahead of the starting processing unit within the series, and
   wherein the control logic is configured to issue the mask input to control the prior processing units to feed a seed value to the starting processing unit.

18. The circuit of claim 15, wherein the mask input is a data value that when combined with the seed value in one processing unit of the plurality of processing units causes the one processing unit of the plurality of processing units to pass the seed value as a result without altering the seed value, and wherein the one processing unit of the plurality of processing units passes the seed value to an immediately subsequent one of the plurality of processing units in the series.

19. The circuit of claim 15, wherein the plurality of data lanes form a data bus that provides the data block to the CRC block, and wherein the control logic is configured to initialize the starting processing unit and begin a CRC calculation for the data block to avoid re-arranging the data block on the plurality of data lanes.

20. The circuit of claim 15, wherein the control logic is configured to initialize a staring processing unit from the plurality of processing units;

wherein the starting processing unit uses the seed value as an initial data value to compute an intermediate cyclic redundancy check (CRC) value for an initial sub-block of the data block, wherein the intermediate CRC value is provided as an input to a subsequent one of the plurality of processing units in the series; and     wherein each of the plurality of processing units are configured to use a result from a previous one of the plurality of processing units in the series along with one of the sub-blocks to compute intermediate results for the CRC value.

\* \* \* \* \*